United States Patent [19]
Amadesi et al.

[11] Patent Number: 5,337,683
[45] Date of Patent: Aug. 16, 1994

[54] PROCESS AND PLANT FOR THE DISPOSAL OF WASTE

[75] Inventors: Paolo Amadesi; Fabio Cappelli, both of Bologna; Sergio Pazzaglia, S. Lazzaro di Savena, all of Italy

[73] Assignee: ITEA S.r.l., Italy

[21] Appl. No.: 953,119

[22] Filed: Sep. 29, 1992

[30] Foreign Application Priority Data

Oct. 8, 1991 [IT]  Italy ................... BO91 A 000356

[51] Int. Cl.$^5$ ................................. F23G 5/00
[52] U.S. Cl. .................... 110/346; 110/203; 110/223; 110/235; 110/242
[58] Field of Search ............... 110/241, 242, 235, 346, 110/203, 223

[56]  References Cited
U.S. PATENT DOCUMENTS

4,829,911  5/1989  Nielson ........................... 110/242 X
5,022,848  6/1991  Fowler ........................... 110/242 X
5,072,675  12/1991  Fowler ........................... 110/242 X Primary Examiner—Edward G. Favors
Attorney, Agent, or Firm—Larson and Taylor

[57] ABSTRACT

Waste is treated in a furnace (6) which is pressurized by injecting thereinto either air which is strongly enriched with oxygen (even up to 100%), so that the temperature of oxidation of said waste, after a starting step wherein external fuel and said combustion supported are used, reaches so high values as to cause a substantial sublimation of said waste and its complete molecular cracking. The vapors resulting from the hyperbaric sublimation process are then submitted to a rapid adiabatic expansion or semi-adiabatic expansion in a suitable volume (23) to cause a first strong cooling of said gases, down to values which may be then abated by usual heat-dissipating systems (25–26).

15 Claims, 3 Drawing Sheets

PROCESS AND PLANT FOR THE DISPOSAL OF WASTE

Waste disposal by incineration is effected presently either by exploiting partly the heat from the combustion of said waste, or by using exclusively the heat generated by an external fuel.

The known incinerators present the following disadvantages:
- they are unable to treat and neutralize industrial or particular waste such as, for example, contaminated soil or mud, asbestos, and the like;
- they produce gaseous chlorinated chains (more than 200 different dioxins, only known in part) generated by the disposal of PVC and the like;
- they produce sulphur oxides which can be hardly filtered, generated by liquid fuels used in the incineration process and likely polluting the environment with components which are the main cause of the "acid rains";
- they produce nitrogen oxides, which cannot be filtered at all, generated by the aggregation of oxygen and nitrogen in the combustion-supporting air, said formation being more likely to occur with the increase of combustion temperature and being responsible for the successive formation of nitrates, nitrites and respective acids in the environment;
- high fuel consumption due to the low heat from the combustion of average waste. A perfect and total incineration of waste cannot be obtained at all times, so that traces of the original waste may be found in the residual combustion products;
- the management is economically acceptable only in case of very large amounts of waste, which requires the preparation of an extensive road network for transportation and prevents the local disposal of particular waste, for example, hospital waste.

Moreover, incineration—as well as other waste disposal methods—is often conditioned by a hypothetic economical utilization of residues, which is almost always a utopian objective.

Due to the reasons set forth above and in order to avoid that the incineration of waste, carried out in undiscriminated manner, entails environmental pollution, the designs and operation of incineration plants must comply with strict Law Regulations which are more and more severe, and said compliance entrails a complicate adaptation in case of existing plants and a high capital and running cost in case of new plants based on conventional methods.

The present invention relates to a new method and plant for the incineration of any type of waste, which are free from the disadvantages mentioned above and which are based upon the idea disclosed hereinafter.

Waste is treated in a furnace which is pressurized, preferably above 30 bar, by injecting thereinto air which is strongly enriched with oxygen, even up to 100%, to support an exo-energetic oxidation process which raises the temperature of the process to values above 1800° C., which are required to ensure the substantial sublimation of said waste and its complete molecular cracking. By effecting the oxidation under pressure as stated above, moreover, the gases obtained from the sublimation can be submitted to a successive rapid adiabatic or semi-adiabatic expansion in a suitable volume and/or by suitable mechanical systems, such as, for example, gas turbines or the like, to obtain a first strong cooling of said gases, down to temperatures between 200° and 300° C., compatible with any normal heat dissipation system.

The pressurization of the processing furnace, therefore, is a determinant both for reaching said very high temperature (above 1800° C.) required to initiate a substantial sublimation process, and to render the technical difficulties in the disposal of heat from the vapors generated by said sublimation acceptable.

The parameters of the temperature/pressure function depend upon the characteristics of the waste being treated, as evidenced below.

On an average, at pressures ranging between 30 and 70 bar, temperatures between 1800° and 2200° C. can be reached in the furnace, and at 100 bar (maximum design pressure of the plant described below) a temperature of 2500° C. or more could be reached theoretically if suitable refractory materials for insulating the furnace were available.

In the following description there is disclosed, by way of non-limiting example and with reference to the accompanying two sheets of drawings, a continuously operating furnace in which the physically-conditioned waste is fed under pressure into the processing furnace at a speed which is regulated automatically so as to keep the temperature/pressure parameters within the pre-established optimum values.

The plant disclosed herein has been designed to comply with all European and International Regulations relating to structures which are submitted to mechanical and thermal stresses (ASME, DIN, TEMA). Said plant is of the mobile type and of such dimensions as to be accommodated in a container to be mounted on a normal tractor. The capacity of waste disposal ranges between 500 and 1000 Kg/h, depending upon the type and composition of said waste, with a unit consumption of oxygen between 0.1 and 0.5 Kg of oxygen per Kg of waste, depending upon the type of waste and its oxidation heat requirements. Oxygen may be stored in the liquid state within usual containers which are enclosed in a suitable frame.

The mobile plant, therefore, is adapted to be displaced rapidly either to effect the waste disposal along the travel, or to reach the site of disposal where not high amounts of waste will be treated at one time. The same tractor, or other similar tractor, without particular equipment, can easily load and unload the plant, unprovided with oxygen tanks, to and from different sites where the plant may be used indefinitely to treat even large amounts of waste.

The transportability of the plant is made possible thanks to its containerizable size and to suitable hoisting eyebolts.

Should the disposal of considerable amounts of waste be required, a plurality of plants could be transported and mounted on stationary structures at the site of use, where they may be operated either together or separately. For this particular use, the user should either install stationarily on the site liquid oxygen refillable tanks, with selective storage, or install suitable conventional devices for separating gaseous oxygen from atmospheric air.

Figure 1:
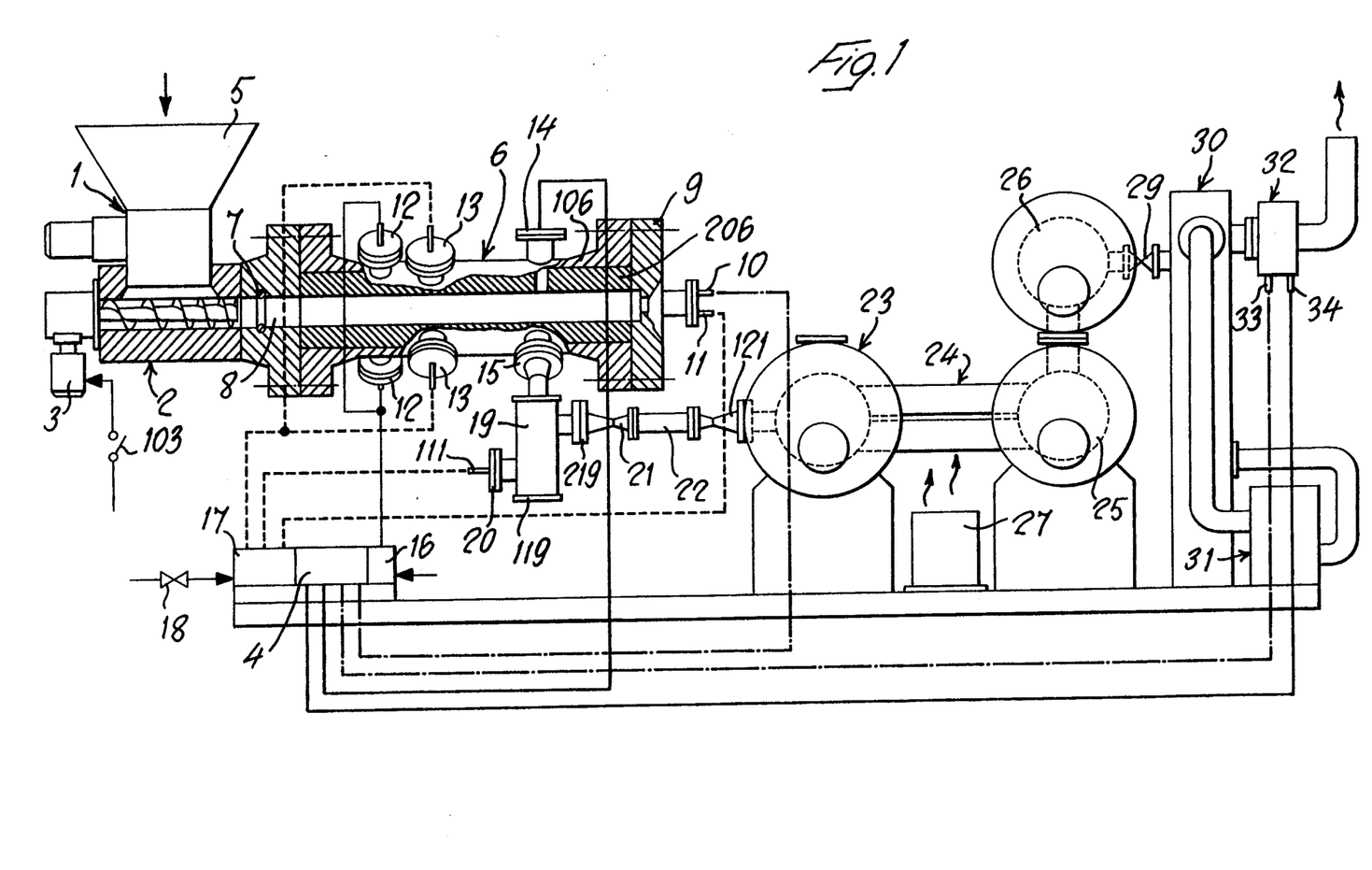
FIG. 1 is a diagrammatic side elevational view of the plant, partly sectioned at the feeding unit and furnace.

Waste to be destroyed shall be available in a loose condition, the individual fragments of non compressible materials not exceeding 50 mm, i.e. said materials being of a nature not liable to modify their dimensions even if submitted to mechanical pressure of a few hundreds bar. The crushing of waste may be effected, for example, by a mill 1 of suitable type feeding a metallic screw conveyor 2 controlled by a variable speed motor 3 connected to a control panel 4 to be described below.

The screw of the conveyor 2 is characterized, for example, by a core with progressively increasing diameter; other devices, easily conceivable by those skilled in the art, are provided to achieve a high compression of waste, e.g. above a few hundreds bar, to ensure a sufficient density and compaction granting a gas-tight introduction of the extruded compacted waste into the furnace, bearing in mind the high pressure existing therein.

The hopper 5, into which the waste is introduced, is provided with level indicators (not shown) capable of discontinuing automatically the process in case any discontinuance in the feeding should not ensure the continuity and compactness of the extruded waste introduced into the furnace.

It is to be understood that said feeding means is merely illustrative and may be changed depending upon the particular types of waste not available in a loose condition, such as, for example, tires, bodies of dead animals, semi-solid sludges or dried powders. Moreover, it is not to be excluded that, to ensure the gas-tightness of the furnace at the waste-feeding side and to relieve the screw conveyor 2 of its burden, the feeding means or a part thereof may be accommodated in a chamber which is periodically supplied with waste, which is sealed from the environment and which, if desired, may be pressurized.

Moreover, it is not to be excluded that the plant may be provided with two waste-feeding units, arranged at the opposite ends of the furnace (see below), which may be operated in parallel or which—in case of failure of the main feeding unit (equipped with means for sealingly isolate it from the furnace)—cause the auxiliary feeding unit to start operating without requiring the stoppage of the plant.

The furnace 6 comprises a cylinder 106 made of special steel, having an outer diameter on the order of about 600 mm, a thickness of about 60 mm, and lined interiorly with a liner 206 made of any suitable refractory material capable of resisting the high temperatures involved for the destruction of waste. The liner 206 may be made, for example, of silicon carbide and may have an average thickness of about 140 mm.

The cylindrical portion of the furnace 6, about 1500 mm long, terminates at the ends thereof in frusto-conical unions provided with large flanges, one of which is sealingly secured to a similar flange of the feeding unit 2.

The numeral 7 indicates diagrammatically optional pressure-sealing means arranged between the waste-core feeding chamber 8 and the waste-core itself. It is to be understood that, for this purpose, the feeding chamber 8 may be conveniently pre-arranged in any manner, for example, with a frusto-conical configuration converging in the direction of the furnace 6, and it may be provided with annular ridges with ratchet outline, so as to facilitate the travel of the core towards the furnace and to prevent the reverse travel thereof.

The other end flange of the furnace 6 is closed by a cover 9 having a union which mounts sealingly from the environment: a barometric probe 10 detecting the pressure in the furnace and connected to the control panel 4; a nozzle 11 for supplementary injections of combustion supporter (see below).

The free usable diameter of the furnace 6 is about 200 mm and its inner free total volume is about 45 liters, while the usable volume in which the waste combustion proper occurs is about 30 liters.

The tubular composite wall of the furnace 6 is formed with ten openings which are suitably distributed along the length of said furnace, are suitably orientated and terminate exteriorly in respective pressure-tight nozzles which are insulated interiorly and are used as explained below.

At least two nozzles 12 are arranged at a short distance from the end of the furnace into which the extruded compacted waste is introduced, they are arranged on a circumference the plane of which is perpendicular to the axis of the furnace, they are diametrically opposite to each other and are connected to a circuit for cold firing of the furnace by admitting thereinto, through the priming/reacting unit 16, a pair of hyperbolic compounds comprising; for example, oxygen, hydrazine and their catalysts, so as to obtain a spontaneous reaction capable of raising the temperature of at least a portion of the cold waste to about 400°–500° C., which is sufficient to start the successive oxidation process. The unit 16 has been arranged near the control panel 4 due to its connection to the assembly of devices which are required for the automatic operation of the plant, in compliance with a logic involving the use of said unit 16 also during the operation of the furnace, when—for any reason—the temperature and/or pressure parameters should undergo undesired variations with respect to the normal operation values of said furnace.

Figure 2:
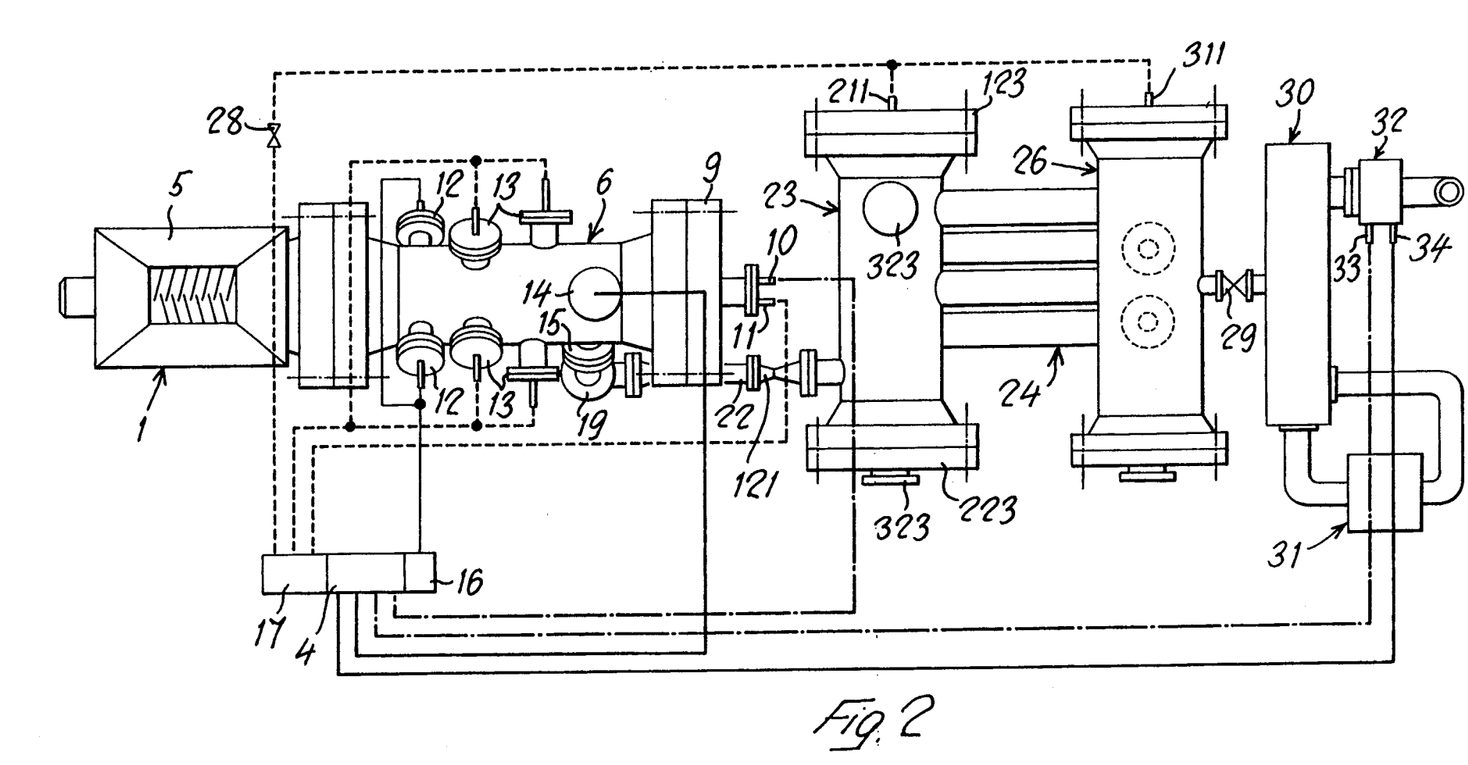
FIG. 2 is a top plan view of the plant.

Six nozzles 13, only part of which can be seen in FIGS. 1 and 2, are arranged in the intermediate portion of the furnace along successive circumferences or along an imaginary helix and are connected to the unit 17 feeding the oxygen/air mixture which is regulated automatically by the values being detected by the pressure/temperature sensors in the furnace. The unit 17 is connected, via a check valve 18, to the feeding ducts from the liquid oxygen tanks (not shown) which are provided with a gasifier to a pressure, for example, of 50 bar. The distribution of the nozzles 13 transversely and longitudinally of the furnace ensures a complete oxidation of the waste and, in the cold-start step, enables the introduction of the gaseous combustion supporter only where the incoming compacted waste is present, so as to eliminate the presence of unused fluids which would decrease the temperature of the process. As stated above, the feeding circuit of the comburent or combustion supporter is also connected to the nozzle 11 which permits the use of the end portion of the furnace as a post-combustion chamber (see below).

A nozzle 14 is provided with a first temperature sensor for process control, which is connected, with the sensor coming from the nozzle 11, to the control panel 4.

The outflow of vapors from the furnace occurs through the nozzle 15 located at the end portion of the furnace. The nozzle 15 communicates with a small chamber 19, also insulated interiorly and capable of withstanding the high pressure in the furnace, provided with a flanged removable cover 119 for cleaning and maintenance.

The chamber 19, in turn, is provided with a nozzle 20 having an injector 111 which is connected to the circuit for the admission of the oxygen/air mixture, whereby it operates also as a post-combustion chamber.

The chamber 19 comprises a flanged outlet duct 219 which communicates, via a converging tube 21, with an adjustable orifice disc or throttler 22.

During the normal operation of the plant, the assembly 21-22 enables the high pressure for the waste sublimation process in the furnace to be maintained within said furnace.

The adjustable throttle 22 communicates, via a convergent tube 121, with an expansion chamber 23 of suitable volume, formed by a cylindrical, composite and sturdy structure, similar to that of the furnace 6, provided with flanged end covers 123, 223 and with drainage doors 323.

In the chamber 23 there will occur the adiabatic or semi-adiabatic expansion leading to the condensation of the first elements or compounds existing in the discharged vapors and having the highest sublimation temperature.

Through a set of discharge pipes 24, the expansion chamber 28 is connected to a pair of condensers 25 and 26 which are, for example, connected serially to each other.

The tube nest 24 is cooled by electrical fans 27 to cause the condensation of the components in the discharged vapors that have an intermediate sublimation temperature.

During the normal operation of the plant, the medium pressure downstream of the throttle 22 is about 5-10% of the pressure in the furnace and the temperature of the gases or vapors at the entrance of the condensers does not exceed 200°-300° C.

The heat dissipation from the residual vapors occurs in the condensers 25-26 having any suitable structure. Said condensers may comprise exchangers of conventional water-tube type including forced-ventilation external radiators, all of which may be easily devised and constructed by those skilled in the art.

The condenser 26 may accommodate a first device of any conventional type for neutralizing the harmful residual gases, which are gaseous at low temperature, such as the chlorine deriving from PVC.

From FIG. 2 it can be seen that the expansion chamber 23 and condensers 25-26 are provided with injectors 211-311 connected to the delivery circuit of the oxygen/air mixture via a check valve 28.

The volume of the circuit downstream of the assembly of throttling valves 21-22-121 is, for example, on the order of about 1,500 liters.

The discharge of the condenser 26 is equipped with an electrically-controlled valve 29 connected to the control panel 4, which during the normal operation of the plant is in the opened condition, while it is closed in the cold firing step, to enable the normal-operation pressure and temperature to build up in the furnace 6.

Means 103 are provided to stop the operation of the conveyor 2 when, in the starting step, the front end of the extruded compacted waste has reached a given position in the furnace 6. Through the priming/reacting unit 16 and the nozzles 12, the oxidation process of the waste is primed and the conveyor 2 is activated at a low speed. During this step, the first nozzles 13 near the nozzles 12 may admit oxygen into the furnace. When the pressure and temperature probes in the furnace 6 detect the pre-established values of pressure and temperature, the priming unit 12-16 is de-activated, the conveyor 2 is operated at normal speed and the valve 29 is opened, while the nozzles 13-20 and injector 11 start their rated operation.

Finally, the valve 29 is connected to a conventional quenching apparatus 30 having the main function to acidify the residual toxic gases and neutralizing them completely, and having the secondary protecting function to precipitate and collect into a suitable ash-collector 31 the powders possibly existing in the discharged gases notwithstanding the sublimation and condensation process.

The residual vapors from the quenching apparatus 30, practically formed by carbon dioxide, reach the discharge stack 32 provided with pressure and temperature sensors 33 and 34 connected to the control panel 4.

In FIGS. 1 and 2, the combustion-supporter delivery circuits are shown by bold broken lines, the pressure detection circuits are shown by bold dot-and-dash lines, and the temperature detection circuits are shown by bold solid lines.

Contrarily to what has been illustrated, temperature and pressure detecting circuits may be provided as well in the expansion chamber 23 and condensers 25-26.

The operation of the plant, both in the cold-start step and the rated operation, is controlled by a number of variables, such as:

the flowrate of the waste being fed, by means of the variation of rotation of the screw-conveyor 2;

the composition of the oxygen/air mixture, as well as the pressure and volumetric flowrate of injecting it into the various areas of the plant;

the pressure and temperature of the furnace 6;

the pressure and temperature in the discharge 32.

The pressure and temperature parameters sent to the control panel 4 are processed by software and processor unit for continuous adjustment of the other process variables mentioned above, so as to ensure a constant and correct operation of the plant.

The weight of ashes collected in the condensation circuit depends upon the type of waste being treated and it ranges between 1 and 0.1% of the weight of waste. The discharge 32 may be provided, at least in the setup period of the plant, with physical/chemical instruments capable of checking whether the emissions are as expected and anyway are lower than required by the Regulations in force. If desired, said instruments may be connected to the control panel 4 for continuous check and for feedback adjustments on the other variables of the process.

The maintenance required by the plant relates mainly to the replacement of the insulation in the furnace 6. Thanks to its flanged construction, the entire furnace can be replaced with a new or a restored one, so as to minimize the unoperative down time of the plant.

The basic data for the design of said plant and for the process thermodynamics have been derived from the examination of two different types of waste, namely the solid urban waste (RSU) and an inorganic waste such as asbestos, which are characterized by a considerable difference in their oxidation heats.

The average composition of waste is shown in the following Table A, whereas the Table B shows the average oxidation heats of the various elements (N.B.S.-U.S.A.).

Common asbestos is mainly constituted by Anthophyllite $(Mg,Fe)_7[OH|Si_4O_{11}]_2$.

TABLE A

| WASTE | COMPOSING SUBSTANCE | % TOT. | COMPOSING ELEMENTS Weight percentages, partial | | | | | | | | | |
|---|---|---|---|---|---|---|---|---|---|---|---|---|
| | | | H | C | N | O | Cl | Si | Fe | Al | Ca | Mg | $H_2O$ |
| SOLID URBAN | Organ. matter | 20 | 5 | 30 | 15 | 50 | | | | | | | |
| | Paper | 40 | 15 | 30 | | 55 | | | | | | | |
| | Plastics | 20 | 10 | 70 | | | 20 | | | | | | |
| | Glass | 10 | | | | 30 | | 70 | | | | | |
| | Metals | 5 | | | | | | | 60 | 40 | | | |
| | Inert subst. | 5 | | | | | | | | | 60 | | 40 |
| | TOTALS | 100 | 9 | 32 | 3 | 35 | 4 | 7 | 3 | 2 | 3 | | 2 |
| ASBESTOS | TOTALS | 100 | tr | | | 32 | | 19 | 32 | | | 14 | 3 |

TABLE B

| ELEMENT | OXID. HEAT KJ/Kg (elem.) | REQUIRED OXYGEN Kg/Kg (element) | REQUIRED OXYGEN (Kg/kg waste) | | DEVELOPED HEAT (KJ/Kg waste) | |
|---|---|---|---|---|---|---|
| | | | RSU | ASBESTOS | RSU | ASBESTOS |
| H | 142300 | 8,00 | 0,72 | neglig. | 12810 | neglig. |
| Al | 62015 | 0,89 | 0,02 | | 1240 | |
| Si | 28870 | 1,14 | 0.08 | 0,22 | 2020 | 5485 |
| C | 28100 | 1,14 | 0.37 | | 8990 | |
| Mg | 25085 | 0,67 | | 0,09 | | 3510 |
| Ca | 15880 | 0,40 | | | 475 | |
| Fe | 4860 | 0,29 | | 0,09 | 145 | 1555 |
| N | −2120 | 1,86 | 0,06 | | −65 | |
| Cl | −2963 | 0,90 | 0,04 | | −120 | |
| TOTALS | | | 1,29 | 0,40 | 25500 | 10550 |
| Existing in waste | | | 0,35 | 0,32 | | |
| Residual $O_2$ to be supplied | | | 0,94 | 0,08 | | |
| UNITARY HEAT (KJ/Kg$O_2$) | | | | | 19770 | 26380 |
| AVAILABLE HEAT (R) = (KJ/Kg waste) | | | | | 18580 | 1870 |
| = (Cal/kg waste) | | | | | 4440 | 450 |
| OXIDATION FACTOR (K) (Kg waste oxid./Kg $O_2$) | | | | | 1,1 | 12,5 |

For checking the process thermodynamics, a (m$^2$) and L (m) indicate the utilizable area and length, respectively, of the cylindrical volume of the furnace 6.

The area and the density of the cylindrical extruded compacted waste being introduced into the furnace by the screw conveyor are indicated by a and $\rho$ (Kg/m$^2$), respectively. The speed of introduction of the core of waste into the furnace is indicated by v (m/sec).

Finally, V indicates the volume of the expansion chamber and condensers 23-24-25-26 which is sealed from the environment by the valve 29 during the transient step.

During the initial transient step, the containment volume, practically, is V, the volume of the furnace 6 being negligible with reaper t there to.

After the initial introduction of the leading portion of the compacted waste, the destruction of the oxidation-gasified material makes said leading portion assume an ogival configuration whose smaller diameter may become zero at a distance <L from the entrance.

As stated above with reference to FIGS. 1 and 2, the injection of comburent into the furnace is effected through a plurality of nozzles 13 which are suitably distributed on the side surface of the furnace, whereby the core of waste is oxidated completely and homogeneously during the rated operation of the plant. Said distribution of the comburent nozzles is advantageous also during the transient step in order to effect the injection of oxygen only at the portion of the core that progressively enters the furnace, by activating said nozzles in a suitable succession, so as to avoid wasting the comburent and to avoid any undesired increase of pressure, which would result in a reduction of the temperature in the furnace. By this provision, an oxygen flowrate per unit of length q (Kg/m) can be defined in the initial transient step.

"Transient in shape" means the initial cold-start step during which the shape of the extruded compacted mass of waste changes with the time, and "transient in temperature and pressure" means the initial step wherein the temperature and pressure of the gases progressively filling the volume aL+V≅L increase to a value T where the sublimation of the material even if not oxidated initiates, and to a value p of rated operation.

On completion of the transient in shape step, the volume of waste in the furnace 6 is stabilized, and on completion of the transient in temperature/pressure step the sublimation is initiated, whilst on completion of the longer of the two transients the rated operation is initiated.

The cold-start transient step will be now examined, assuming that the ignition through the nozzles 12 has already been effected. The unit of measurement system is the MKh (sq.m/Kg/hour).

At t=0 the leading end of the core appears at the furnace inlet, and at a given time t<L/v said end is at an abscissa S=vt<L from the inlet.

A portion of core, of a length dx and initial area a, introduced into the furnace at the moment $\tau$<t, at the time t will be located on an abscissa x=v(t−$\tau$). Its area is A($\tau$, t) its volume is A($\tau$, t)dx and its mass is A($\tau$, t)$\rho$dx. During the time t−$\tau$ the core has been lapped by a volume of oxygen qdx(t−$\tau$) or, if the density of oxygen is assumed to be one, by a mass qdx(t−$\tau$) of oxygen which in the same time has oxidated a mass Kqdx(t−$\tau$) thereof. The volume of the generic portion of compacted mass of waste at the time t and the area thereof have become:

$$A(\tau, t)\, dx = a\, dx - Kq(t - \tau)dx$$

$$A(\tau, t) = a - Kq\frac{t - \tau}{\rho}$$

Bearing in mind that $t - \tau = x/v$, it ensues therefrom that the area of the portion, a function of only the abscissa, is:

$$A(x) = a - \frac{Kq}{\rho v} x \qquad (1)$$

The formula (1) gives the values of the abscissa areas $x = vt$ during the transient in shape, while the leading end of the compacted mass of waste is at the abscissa $x = vt$ and has a minimum area:

$$A(x = vt) = a - \frac{Kqvt}{\rho v} = a - \frac{kqt}{\rho} \qquad (2)$$

The volume $Vc(t)$ occupied by the compacted mass of waste at the generic time $t \leq L/v$ is obtained by integrating the (1) from 0 to $vt$, wherein $vt$ may assume the maximum value of $vt = L$:

$$Vc(t) = {}_0|^{vt} A(x)dx = avt - \frac{qKvt^2}{2\rho} \qquad (3)$$

At the time $t$, the masses H and M of dispensed oxygen and gasified waste, the mass N of solid waste in the volume being oxidized, and the released value $W(t)$, are:

$$H(t) = {}_0|^{vt} qdx\, {}_0|^t dt = qvt^2 \text{ Kg of dispensed } O_2 \qquad (4)$$

$$M(t) = Kqvt^2 \text{ Kg of gasified waste (cu.m. of vapors produced)} \qquad (5)$$

$$N(t) = \rho Vc(t) = avt\rho - \frac{Kqvt^2}{2} \text{ Kg of solid waste being present} \qquad (6)$$

$$W(t) = RKqvt^2 \text{ Kcal produced} \qquad (7)$$

The average differential of temperature $\Delta T(t)$ and the pressure $p(t)$ at the moment $t$ are:

$$\Delta T(t) = \frac{W(t)}{\{[(K + 1)qvt^2]/\rho_G + V\} c_G + N(t) c_S} \qquad (8)$$

$$p(t) = \frac{\Delta T(t) + 300}{300} \cdot \frac{V + [H(t) + M(t)]/\rho_G}{V} \qquad (9)$$

Assuming, for operative hypothesis, that:

$\rho_G$ = average density of gases NTP = 1 Kg/cu.m.
$c_G$ = average specific heat of gases NTP = 0.25 Cal/cu.m $\times$ °K.
$c_S$ = average specific heat of solid waste = 1 Cal/Kg $\times$ °K.
$\rho$ = average density of compacted waste = 750 Kg/cu.m and by inserting an operating variable $z = q/v$ and an operating function $F = q/t$ and by indicating for graphic simplicity $\Delta T(t) = T$ $p(t) = p$ and by rounding the value of a $\rho$ to 25, we will have:

$$T = \frac{4RKF^2}{(1 - K)F^2 + 100f + Vz} \qquad (10)$$

$$p = \frac{T + 300}{300} \cdot \frac{Vz + (1 + K)F^2}{Vz} \qquad (11)$$

If $V = 1.5$ cu.m and $T = (\Delta T) = 1800°$ C. (initial temperature of sublimation and final temperature of the temperature/pressure transient), and $p = 50$ Bar (pressure exerted at the end of said transient), and if R is expressed in Mega-calories, the formulas (10) and (11) become:

$$(4KR + 1.8K - 1.8)F^2 - 180F - 2.7z = 0 \qquad (12)$$

$$(1 + K)F^2 - 9.2z = 0 \qquad (13)$$

By eliminating the term in $z$ in (12) and in (13), we will have:

$$F = \frac{613.33}{(13.63R + 5.13)K - 7.13} \qquad (14)$$

In the cases of RSU ($R = 4.44$ and $K = 1.1$) and of ASBESTOS ($R = 0.45$ and $K = 12.5$) we will have:

(RSU) $F = qt = 9.4$ Kg/m
" $z = q/v = 20.3$ Kg/sq.m
(RSU) $vt = F/z = 0.46$ m
(ASBESTOS) $F = qt = 4.6$ kg/m
" $z = q/v = 31$ Kg/sq.m
(ASBESTOS) $vt = F/z = 0.14$ m

Therefore, the end of the transient step, or the combination $\Delta T = 1800°$ C. and $p = 50$ Bar, occurs when the leading end of the compacted mass of waste is in the space between 50 and 15 cm from the inlet and, therefore, before reaching the maximum abscissa L, whereby the temperature/pressure transient step is more rapid than that of the transient in shape.

The first two equations permit, by establishing the value of $q$, to determine the value of the initial $v$ and the time $t$ from the introduction at which the temperature transient terminates.

For calculating the steady operation step—assuming a total oxygen flowrate Q (Kg/h), and beginning from the end of the transient step—the following parameters and data are indicated:

Flowrate of oxygen being introduced: Q Kg/h = Q cu.m NTP/h
Temperature of oxidation: $T_o = 400°$ C.
Temperature of sublimation: $T_s = 1800°$ C.
Oxidated mass: KQ Kg/h
Non-oxidated, sublimated mass: M Kg/h
Flowrate of introduced waste: $P = KQ + M$ Kg/h
Sensible heat of introduced $O_2$: $C_o = Q \times 0.25 \times 400 = 100Q$ Kcal/h
Sensible heat of introduced RSU: $C_R = 400KQ + 1800M$ Kcal/h
Sensible heat of introduced (NTP): $C_G = 0.25(T_s - T_o)(1 + K)Q = 350 (1 + K)Q$ Kcal/h
Latent heat of sublimation (exc.): 600M Kcal/h (see Perry-Chem.Handbook)
Developed heat: RKQ Kcal/h
Thermal balance equation: $RKQ = C_o + C_R + C_G + 600M = Q(450 + 750K) + 2400M$ Oxidated and sublimated mass: $M = \dfrac{K(R - 750) - 450Q}{2400}$ Production (steady operation): $P =$ $$M + KQ = \dfrac{K(R + 1650) - 450Q}{2400}$$

In the two cases being examined, the values of oxidated and sublimated mass, production P and speed $v = P/a\rho$, will be given as follows:

(RSU)     $M = 1.5Q$ Kg/h
(ASBESTOS) $M = 0$ "
$P = 2.6Q$    Kg/h
$P = 12.5Q$ "
$v = 0.11Q$ m/h
$v = 0.53Q$ "

The equation (11) may also be expressed as follows:

$$\Delta T = 300 \left( \dfrac{pVz}{Vz + (1+K)F^2} - 1 \right)$$

wherefrom, if T>0, we will obtain:

$$pVz > Vz + (1+K)F^2$$

$$p > 1 + \dfrac{(1+K)F^2}{Vz} = 1 + \dfrac{(1+K)qzt^2}{V}$$

As a result, it is always unavoidable that p>1 (even if slightly, as occurring in practically non-pressurized boilers), and moreover, in case of very high $\Delta T$ as necessary for sublimation (minimum value 1800° C.), we must have:

$$p_{max} > p > 6\dfrac{(1+K)qvt^2}{V} \quad \dfrac{6(1+K)qvt^2}{V} p_{max}$$

From the first inequality we can also deduce that p must be considerably high in order to obtain the desired T; from the second we can deduce that, in order to maintain in the transient step an acceptable production simultaneously with a comparatively non-high pressure (i.e.) high q and v and $p \leqq 50$ Bar in running operation), we should have a high V (in the preceding case V=1.5 cu.m).

These considerations confirm the novel importance of pressurization in the combustion chamber and accurate calculation of the minimum value of V.

The advantages resulting from the plant according to the invention may be summarized as follows.

The new process enables the treatment of all solid and semi-solid waste and material which, due to the very high temperature reached thanks to the oxidation, are sublimated almost entirely.

MODALITY OF COMBUSTION

The function of post-combustion chamber is granted by the supplementary oxygen injections at the end of the volume of the furnace.

TEMPERATURES

The temperatures which are reached are above 2000° C., therefore much higher than the minimum limits prescribed by the Regulations in force for any type of waste, without requiring the use of auxiliary burners.

The consumption of oxygen ranges from 10 to 40% of the waste being treated, depending upon the nature of said waste.

VELOCITY OF FUMES AND TIME OF DWELL IN THE POST-CHAMBER

Oxidation corresponds to a complete combustion of waste, so that neither turbulence nor a minimum velocity of fumes should be necessary. The time of resistance of the temperatures mentioned above exceeds 15-20 seconds.

POWDERS AND HEAVY METALS

No powder-abating systems are needed, because at said high temperatures powders are vaporized almost completely together with heavy metals, and in the condensing stages the separation is effected of nearly the totality of the residual elements which are solid at temperatures below 100° C., and the final check system eliminates even the traces thereof.

POLYCYCLIC HYDROCARBONS, CHLORIDIZED RINGS, Cl, HF, SOx, NOx

At the temperatures that are attained, the molecular dissociation is complete and the formation occurs of: $CO_2$, H which oxidizes quickly, Cl (or F) from PVC (which can be neutralized in the condenser 26 and the quenching apparatus 30), whilst SOx are practically absent due to the absence of hydrocarbons in the combustion-supporter, and especially NOx are absent due to the initial absence of N.

ASHES

Practically, ashes are reduced to the individual elements which are solid at the discharge temperatures, or to refractory oxides which may possibly be present, and the estimated amounts are much lower than 1% of the initial waste, and practically with no transferable toxicity. Ashes are non-toxic and non-infectious products and they may be recovered and re-used as such with no further treatment.

In addition to these considerations, in compliance with the present Regulations concerning the incineration of waste, the following considerations should be taken into account.

The plant may be installed on a mobile vehicle with self-contained supply of oxygen, or it may be transported and positioned at any one time on the utilization site, or it may be added to other plants for treating very large amounts of waste, said plant being easily unloadable from the vehicle for stationary arrangement.

The weight of the containerized plant, including the oxygen tanks, excluding the tractor, is lower than 20 tons, whereby it is not to be submitted to the formalities concerning the transport of exceptional loads.

Figure 3:
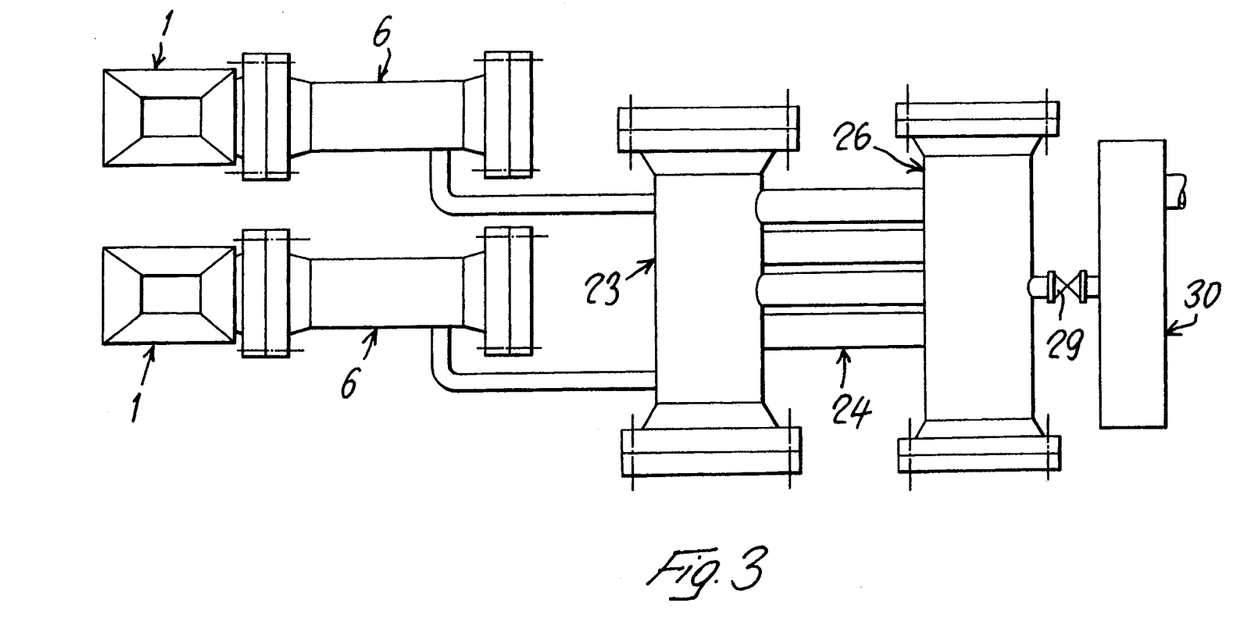
FIG. 3 is a diagrammatic top plan view of the invention, illustrating plural plants.

A plurality of modules may be joined together to form stationary or semi-stationary plants having high or very high capacity. In this instance it is not to be excluded that the structure of the plant may be modified for reasons of economy, for example, as shown in FIG. 3 by providing a plurality of furnaces with respective feeding means, which utilize common means for expansion, final cooling and neutralization of harmful gases and powders, all of which may be easily devised and constructed by those skilled in the art.

The plant may be used for any type of inorganic solid waste, such as fibers of asbestos, muds, semi-liquid polluted sludges or semi-solid dry residues, or else organic waste such as solid or semi-solid residues of tannery, dairy, olive-pressing, or else small bodies of dead animals, waste of butchery, etc. Every type of waste will be supplied by a suitable furnace-feeding unit and if desired, the furnace may be provided with an additional feeding unit either in parallel or with stand-by functions.

The plant requires a reduced maintenance and can be attended by a single person.

Moreover, it is to be borne in mind that the plant lends itself to a considerable energy recovery either by using the expansion chamber 23 as a heat source for a small power plant, or by arranging—instead of said expansion chamber—a gas turbine coupled to an electric generator.

It is to be understood that the description is referred to a preferred embodiment of the invention, and that many changes and modifications, especially of constructional nature, may be made thereto without departing from the basic principle of the invention, as disclosed above, as shown and as claimed hereinafter.

We claim:

1. A process for the disposal of waste, comprising the steps of:
   depositing the waste in a pressurized furnace;
   injecting a comburent consisting of air enriched by oxygen into said furnace to achieve a predetermined temperature and pressure for causing sublimation and complete molecular cracking of the waste;
   subjecting the gases or vapors resulting from the sublimation to a rapid adiabatic or semi-adiabatic expansion within at least one of a suitable volume or a suitable mechanical system to cause a first strong cooling of said gases or vapors; and
   cooling said gases in a conventional heat-dissipating system.

2. The process according to claim 1 wherein the comburent is injected into the furnace at a pressure between 30 and 100 bar.

3. The process according to claim 1, wherein the comburent is injected both in the region immediately downstream of the furnace and in regions where expansion and final-cooling occur to ensure a complete oxidation of vapors and gases resulting from the sublimation.

4. The process according to claim 1, further comprising the steps of treating the gases after said step of cooling to neutralize residual harmful gases and to collect and eliminate traces of powders so that the residual fumes released to the atmosphere comprise substantially carbon dioxide.

5. The process according to claim 1, wherein said steps of depositing, subjecting and cooling are performed in a continuous process.

6. The process according to claim 5, further comprising the steps of compressing the waste before the step of depositing to form a compacted mass which is fed into the pressurized furnace to form a plug capable of resisting process pressures.

7. The process according to claim 6, wherein the step of depositing comprises closing a final valve, feeding the compacted mass of waste to a pre-established point of the furnace by means of a screw-conveyor, and stopping the screw-conveyor igniting the furnace by admitting hydrazine/oxygen and their catalysts thereinto.

8. The process according to claim 7 wherein said step of injecting comprises advancing the screw conveyor slowly while a suitable quantity of comburent is injected into the furnace, and thereafter, when the required pre-established temperature and pressure are reached actuating the screw-conveyor at normal speed, opening the final valve and activating various injection points to maintain said pre-established temperature and pressure in the furnace and to completely oxidize vapors issuing from said furnace.

9. A plant for the disposal of waste comprising:
a) a furnace comprising a first steel cylinder lined on its inner side with a second cylinder comprising a suitable refractory material, the inner side surface of said second cylinder comprising a combustion chamber of the furnace, the ends of said furnace having flanges or other suitable means for removably connecting at least one of said ends to a unit for feeding a compacted mass of waste while the other end is closed by a cover having a union mounted thereon, said union comprising a barometric probe and an injector connected to a comburent feeding circuit to create a post-combustion chamber in an end portion of the furnace, said furnace having on its sidewalls a plurality of suitably-distributed openings terminating in respective nozzles, said nozzles comprising sequentially, from the front end receiving the mass of waste to the end portion;
a first group of nozzles having injectors connected to means for admitting the products for cold firing said furnace into said furnace, said products being capable of raising the temperature of a portion of the waste to 400°–500° C. for priming the successive oxidation process;
a second group of nozzles having injectors connected to a circuit for admitting the comburent oxygen into the furnace;
a third nozzle having a barometric probe;
a fourth nozzle communicating with a first end of a small cylindrical insulated collection chamber for receiving the vapors resulting from the sublimation of waste in the furnace, said collection chamber being closed at the other end by a removable cover and having at least one pair of staggered nozzles, one of said pair of staggered nozzles having an injector connected to the circuit for admitting the comburent, in order to effect a post-oxidation, the other of said pair of staggered nozzles being connected to the expansion unit through valve means for regulating the flowrate;
b) means for supplying the comburent to the furnace, said comburent being formed either by a mixture of air enriched with oxygen or by pure oxygen, and having a pressure suitable for admission into the furnace;
c) a feeding conveyor for treating solid or semi-solid waste, said conveyor being actuated by a variable-speed motor and removably connected to an end of the furnace for feeding continuously thereinto the physically pre-treated compacted mass of waste, and means for ensuring a high-density compaction of the mass of waste and for enabling the waste to enter the furnace, so as to prevent any loss of pressure through said compacted mass;
d) an expansion unit in which the pressurized vapors issuing from the collection chamber undergo the adiabatic or semi-adiabatic expansion to achieve a first abatement of the temperature and pressure of said vapors, said expansion unit having at least one injector for adjustable admission of a comburent;

e) one or more condensers which are cooled by at least air or forced circulation of liquid and provided with at least one injector for adjustable admission of a comburent, one of the condensers being adapted to accommodate an optional conventional device to effect a first neutralization of residual harmful gases;

f) at least one electrically-operated final valve arranged at the outlet of the adapted condenser, said valve being temporarily closed during the starting step of the plant and automatically openable when the temperature in the furnace reaches pre-established values of pressure and temperature required for rated operation of said furnace;

g) a final unit for effecting the definitive neutralization of the residual toxic gases and of the possible traces of powders, such that only carbon dioxide may issue from the discharge stack of said final unit, said stack including at least one thermometric probe and one barometric probe and optional means for analyzing the quality of the effluent gases and to effect feedback adjustments at a control unit; and h) a control unit having all temperature and pressure probes and sensors detecting the minimum presence of waste in the feeding unit connected thereto, for controlling at least the following variables of the process carried out by the plant; feeding flowrate of waste into the furnace by regulating the speed of rotation of the motor for the screw-conveyor, composition of the air/oxygen mixture and pressure ad volumetric flowrate thereof at the various points of injection into the plant, temperature and pressure in the furnace, and temperature and pressure at the outlet.

10. The plant according to claim 9, having a size suitable for accommodation in a container, together with tanks of liquid oxygen, a generator unit and a central control unit for pressurized fluid, whereby the plant can be transported to a site of utilization by means of a normal tractor for containers.

11. The plant according to claim 9, wherein the expansion unit comprises a heat source for a power pack to recover the energy for operating said plant.

12. The plant according to claim 9, wherein the throttle and expansion unit comprise a gas turbine connected to an electric generator for obtaining power required for operating said plant.

13. The plant according to claim 9, wherein the furnace is fed with waste from both ends by at least one feeding unit.

14. The plant according to claim 9, comprising a plurality of similar plants for disposal of large amounts of waste.

15. The plant according to claim 14, wherein the plurality of plants are operated in parallel, the vapors produced by a plurality of furnaces being treated by a common circuit of expansion and final cooling, and neutralization of harmful gases and powders.

* * * * *